Aug. 7, 1956 C. J. H. MONK 2,757,535
APPARATUS FOR THE MEASUREMENT OF SURFACE HARDNESS
Filed Aug. 18, 1952 2 Sheets-Sheet 1

Inventor
Cyril James Henry Monk
By Cushman, Darby & Cushman
Attorneys

United States Patent Office 2,757,535
Patented Aug. 7, 1956

2,757,535

APPARATUS FOR THE MEASUREMENT OF SURFACE HARDNESS

Cyril James Henry Monk, Bourne End, England, assignor to Imperial Chemical Industries Limited, a corporation of Great Britain Application August 18, 1952, Serial No. 304,986

Claims priority, application Great Britain November 7, 1951

7 Claims. (Cl. 73—78)

This invention relates to an improved apparatus for measuring the hardness of surfaces and in particular to an improved apparatus incorporating a rocking pendulum.

A well-known method of measuring the hardness of surfaces, particularly of paint films, is by means of a rocking pendulum, a widely used type of instrument being that known as a Sward rocker. This instrument comprises two identical flat metal rings connected side by side by means of spacer bars. A balance weight is eccentrically mounted between the rings and the period of oscillation of the rocker may be varied by varying the distance of the weight from the central axis of the rings. When such an instrument is set rocking on a surface the amplitude of its motion will decrease and it will eventually come to rest, the rate of decrease in amplitude being a measure of the hardness of the surface, and in practice when measuring surface hardness it is usual to make a count of the number of swings in which the amplitude decreases from one predetermined limit to another. The limits may be determined by means of two spirit level indicators mounted on the instrument at two different angles, these angles being such that when the instrument is at the extreme point of a swing and one or other of the indicators is level, the instrument is then at the beginning or end of the range of amplitude on which the count is being made.

The procedure may be modified by using a mechanical device to set the instrument rocking with a predetermined amplitude but the final observation is still made on a spirit level attached to the instrument. The method then is subject to the disadvantage that a spirit level must be observed while it is in motion and in general, the nature of the observations is such that they are considerably influenced by operator fatigue.

The present invention provides an apparatus for measuring the hardness of surfaces comprising a photoelectric cell, a light source with means to project a beam of light, a rocking pendulum, and means for setting the pendulum rocking with a predetermined initial amplitude, the pendulum being provided with means so shaped and disposed in relation to the beam of light and the photoelectric cell that when the pendulum is rocking with greater than a predetermined critical amplitude the photoelectric cell is periodically exposed to the beam of light.

The means provided on the pendulum may comprise, for example, a shutter adapted to cut off the beam of light directed onto the photoelectric cell, a reflective surface adapted to reflect the beam of light onto the photoelectric cell or a prism adapted to refract the beam of light onto the photoelectric cell.

When the pendulum is set rocking with the predetermined initial amplitude the means provided thereon periodically exposes the photoelectric cell to the beam of light with a frequency corresponding to that of the pendulum. The consequent variation in the level of illumination results in periodic activation of the cell and the impulses thereby generated may be registered or recorded by electrical means. As the pendulum continues to rock the amplitude of its periodic motion decreases until the predetermined critical amplitude is reached. At this point periodic exposure of the cell by the means provided on the pendulum ceases and the cell is thereafter exposed continuously or not at all. The level of illumination thus remains constant and no further impulses are registered or recorded.

The present invention therefore facilitates the counting of the number of swings in which the amplitude decreases from one limit to another since these limits are determined automatically. Further, if the periodic impulses are recorded the whole process may be made automatic.

The invention and the novel features thereof may best be made clear from the following description and the accompanying drawings, in which.

Figure 1:
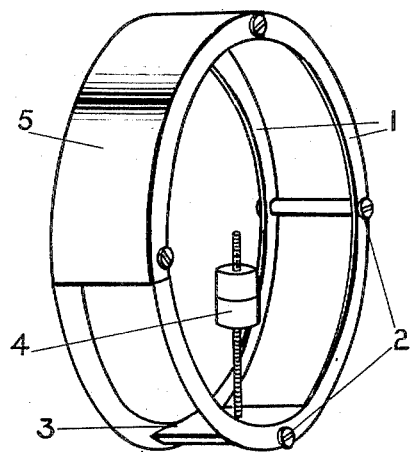
Figure 1 is a perspective view of an illustrative embodiment of the pendulum of the invention.
Figure 3:
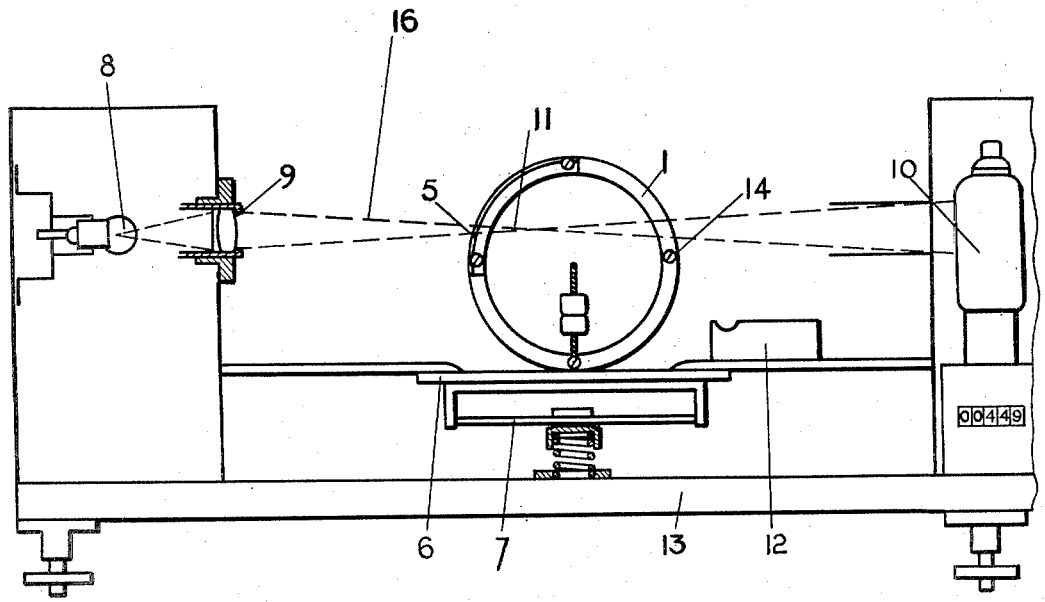
Figure 3 is a side elevational view of the pendulum of Figure 1 in operative relationship to associated elements of the invention.

The rocking pendulum shown in Figure 1 comprises two annular metal rings 1 connected by spacer bars 2, a balance weight 3, an adjustable secondary weight 4, and a shutter 5 the lower edge of which is horizontal. In Figure 3 the pendulum is shown in position on a test panel 6 which is retained in position by a spring loaded holder 7. Light from the electric light bulb 8 is projected in a beam by means of the lens system 9 in the direction of the hooded photoelectric cell 10 but when the instrument is at rest or is rocking with less than a predetermined amplitude the shutter continuously cuts off the beam of light from the photoelectric cell. The normal path of the light beam is indicated by broken lines 16. The electric light bulb has a straight horizontal filament and the lens system 9 is adjusted to focus an image of the filament at the point 11 where the lower edge of the shutter cuts through the beam of light.

The pendulum is set rocking with the greater predetermined amplitude by means of the magnetic starter 12 fixed to the base board 13. The starter comprises an electromagnet provided with grooved pole-pieces and in starting the pendulum rocking the electro-magnet is switched on and the pendulum is tilted until the particular spacer bar 14 is positioned in the grooves in the pole-pieces of the electro-magnet. This spacer bar is of ferromagnetic material and the electro-magnet retains the pendulum in the inclined position until the current is switched off. In this manner the pendulum may be repeatedly set rocking in the same place and with the same initial amplitude.

The photoelectric cell is connected in an electric circuit comprising an amplifier and a counting device and the effect of a change in the amount of light falling on the cell from below to above a certain critical value is used to operate the counting device. The hood fitted to the cell substantially eliminates the effect of light other than that projected from the light source and the electrical circuit is so arranged that the above-mentioned critical value corresponds to approximately 50% of the maximum degree of illumination afforded by the uninterrupted beam of light.

In the starting position the shutter is clear of the beam of light which then falls on the photoelectric cell. When the pendulum is released by the starter it rocks over and the shutter completely cuts off the beam of light from the cell. On the return the shutter rocks completely clear of the beam and this change in the amount of light falling on the cell from complete cut off to full exposure to the light source results in an electrical impulse being transmitted to the counting device which device registers the impulses, each impulse thus corresponding to one swing of the pendulum. As the pendulum continues to rock its amplitude decreases until a point is reached when the shutter no longer swings completely clear of the beam of light and then with each subsequent swing less and less of the beam falls on to the cell until eventually the amount of light falling on the cell ceases to rise above the critical value. From then on no more electrical impulses are transmitted to the counting device and thus the end point of the observation is automatically determined.

In another form of the invention the shutter may be positioned so that when the pendulum is rocking with less than the predetermined amplitude the shutter does not interrupt the light beam at all. Continuous exposure of the cell to the light source does not affect the counting device and so provided that the shutter periodically interrupts the beam when the pendulum is rocking with greater than a predetermined amplitude this arrangement gives the same result as the above since as the amplitude decreases the shutter will begin to cut off less and less of the beam of light until a point is reached when the amount of light falling on the cell is always above the critical value. It is the change from below to above this critical value which operates the counting device and so no further counting takes place when the value is continuously exceeded.

Although a parallel beam of light may be used it has been found that better results are obtained if the beam is focussed to form an image of the source at or adjacent the point at which the beam is crossed by the edge of the shutter, the image being small relative to the light-sensitive area of the photoelectric cell. As a result of this arrangement a relatively small movement of the shutter effects a greater change in the proportion of light falling on the cell than when a parallel beam is used. Consequently the end point of the observation is more accurately determinable.

It has also been found that a further improvement is obtained when the light source is substantially linear and is so orientated that on focussing the beam of light at or adjacent the point where it is crossed by the edge of the shutter the image of the source lies parallel with the edge of the shutter.

Other means of starting the rocker with a predetermined amplitude may be used and in other forms of the invention the pendulum may be rocked at right angles to the beam, that is to say, with the shutter cutting across the beam in the plane of oscillation of the pendulum.

Figure 4:
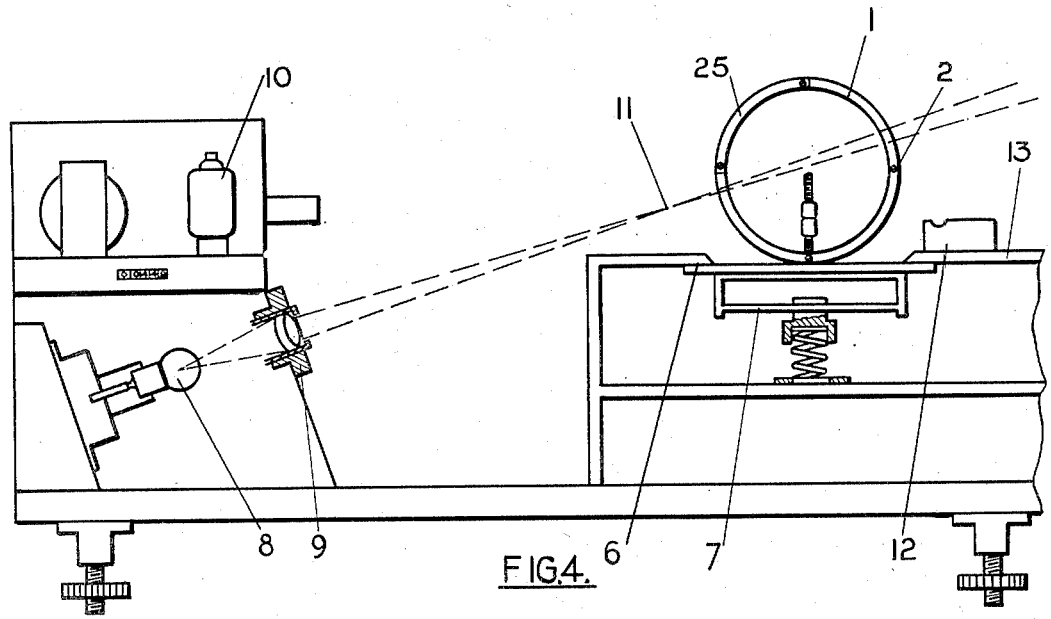
Figure 4 illustrates an arrangement alternative to that of Figure 3, utilizing a pendulum having a mirror as the light intersecting means.

Figure 4 of the drawings illustrates an alternative embodiment of the invention, wherein the rocking pendulum corresponds generally to that of Figure 1 except for the substitution of a reflective surface as the light intercepting element. The rocking pendulum of Figure 4 comprises two metal rings 1 connected by spacer bars 2, a balance weight 3, an adjustable secondary weight 4, and a mirror 25 of polished metal the lower edge of which is horizontal. In Figure 4 the pendulum is shown in position on a test panel 6 which is retained in position by a spring loaded holder 7. Light from the electric light bulb 8 is projected in a beam by means of the lens system 9. When the instrument is at rest or is rocking with less than a predetermined amplitude the mirror is clear of the beam of light, but when the displacement of the pendulum is greater than a predetermined initial amplitude the beam of light is reflected by the mirror onto the photoelectric cell 10. The electric light bulb has a straight horizontal filament and the lens system 9 is adjusted to focus an image of the filament at the point 11 where the lower edge of the mirror cuts through the beam of light.

The pendulum is set rocking as in the previously described apparatus by means of the electromagnetic starter 12 attached to the base board 13.

The photoelectric cell is connected in an electrical circuit comprising an amplifier and a counting device and the effect of a change in the amount of light falling on the cell from below to above a certain critical value is used to operate the counting device. The hood fitted to the cell substantially eliminates the effect of light other than that reflected by the mirror. When the pendulum is in the starting position the mirror is clear of the beam of light and the amount of light falling on the photoelectric cell is below the critical value. On releasing the pendulum it swings over towards the other extreme position and in doing so carries the mirror into the beam of light. The mirror reflects some of the light onto the cell and the increase in the level of illumination of the cell results in an electrical impulse being transmitted to and registered by the counting device. The mirror continuously reflects light onto the cell until, on the return swing of the pendulum, it is carried clear of the beam. On the second complete swing of the pendulum the mirror again causes the counting device to register and this process continues until, as the amplitude of the pendulum decreases, an end point is reached when the mirror is no longer carried into the beam of light and thereafter no more impulses are transmitted from the cell. This end point corresponds to the critical amplitude and so by this invention it is possible automatically to count the number of swings of the pendulum between two predetermined amplitudes.

As before, it has been found that better results are obtainable if the light source is substantially linear and the beam is so focused that the image of the source coincides with that edge of the reflective surface cutting the beam of light.

In another form of the invention the mirror is small and is arranged to reflect light onto the cell momentarily as it passes through the beam. In certain circumstances this arrangement would result in two impulses per complete swing being registered, i. e. one on the forward movement and one on the backward movement, and in order to avoid this an electrical circuit is so arranged that when the impulse is transmitted on the forward movement the source of light is switched off. Thus on the return swing no light is reflected onto the counting cell but a second cell is so disposed and arranged that when the pendulum passes through the mean position light is reflected onto the second cell which transmits an impulse and thereby switches the light source on again.

Figure 2:
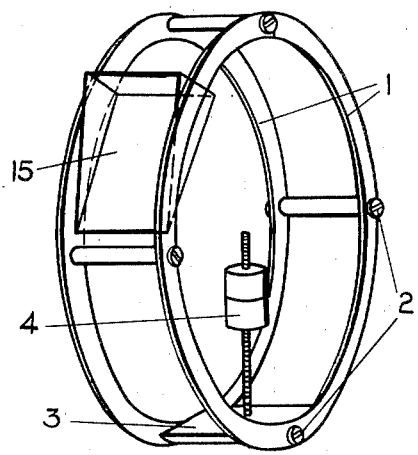
Figure 2 is a perspective view of an embodiment similar to that of Figure 1, but incorporating a prism as the light intersecting means.

In another form of the invention, illustrated in Figure 2, the photoelectric cell may be offset from the line of the beam of light and the pendulum may be provided with a prism 15 so shaped and disposed that when it swings with the pendulum into the beam of light the beam is so refracted as to fall onto the cell.

I claim:

1. Apparatus for measuring the hardness of surfaces comprising means for holding an article with a surface of the article horizontal and uppermost, a ring type rocking pendulum, means for setting said pendulum rocking on the article surface with a predetermined intial amplitude, means for projecting a beam of light through said pendulum in direction normal to the pendulum axis, peripheral light intersecting means on said pendulum adapted to periodically intersect the path of said light beam when the pendulum is rocking with greater than a predetermined critical amplitude, and photoelectric cell means disposed and adapted to detect the periodic intersections of said light beam by said beam intersecting means on the pendulum.

2. Apparatus as defined in claim 1, including means for automatically counting intersections of the light beam detected by said photoelectric cell.

3. Apparatus as defined in claim 1, wherein said means adapted to periodically intersect the path of the light beam is a shutter.

4. Apparatus as defined in claim 1, wherein said means adapted to periodically intersect the path of the light beam is a reflective surface.

5. Apparatus as defined in claim 1, wherein said means adapted to periodically intersect the path of the light beam is a prism.

6. Apparatus as defined in claim 1, including means for focussing said beam of light to produce an image of the light source in the neighborhood of the point of intersection of the light path by the intersecting means on said pendulum, said image being small with respect to the light-sensitive area of said photoelectric cell.

7. Apparatus as defined in claim 1, wherein said beam of light is emitted from a linear light source oriented in substantial coincidence with the leading edge of said light intersecting means on said pendulum.

References Cited in the file of this patent

UNITED STATES PATENTS

| | | |
|---|---|---|
| 499,737 | Howland | June 20, 1893 |
| 1,523,149 | Wheeler | Jan. 13, 1925 |
| 1,787,536 | Hayes | Jan. 6, 1931 |
| 1,792,013 | Hayes | Feb. 10, 1931 |
| 1,935,752 | Sward | Nov. 21, 1933 |
| 2,093,215 | Six et al. | Sept. 14, 1937 |
| 2,304,191 | Mott-Smith | Dec. 8, 1942 |

FOREIGN PATENTS

| | | |
|---|---|---|
| 563,893 | Great Britain | Sept. 4, 1944 |